United States Patent [19]

Akio

[11] Patent Number: 5,110,177
[45] Date of Patent: May 5, 1992

[54] AUTOMOBILE REAR BODY STRUCTURE
[75] Inventor: Shibata Akio, Hiroshima, Japan
[73] Assignee: Mazda Motor Corporation, Hiroshima, Japan
[21] Appl. No.: 584,577
[22] Filed: Sep. 18, 1990
[30] Foreign Application Priority Data Sep. 30, 1989 [JP] Japan .............................. 1-115259[U]

[51] Int. Cl.⁵ ............................................. B60R 27/00
[52] U.S. Cl. .................................... 296/189; 296/195; 296/204; 280/784
[58] Field of Search ................ 296/188, 189, 195, 204, 296/30; 280/784, 791

[56] References Cited

U.S. PATENT DOCUMENTS

| | | |
|---|---|---|
| 2,311,880 | 2/1943 | Sherman . |
| 2,883,232 | 4/1959 | Olley et al. . |
| 3,054,636 | 9/1962 | Wessells, III . |
| 3,108,836 | 10/1963 | Deckert . |
| 3,171,669 | 3/1965 | Barenyi . |
| 3,661,419 | 5/1972 | Mitamura et al. . |
| 3,811,698 | 5/1974 | Glance . |
| 3,827,712 | 8/1974 | Suzuki et al. ........................ 280/784 |
| 3,896,896 | 7/1975 | Saitoh . |
| 4,093,254 | 6/1978 | Ezaki . |
| 4,098,520 | 7/1978 | Ezaki et al. ..................... 296/203 X |
| 4,106,807 | 6/1978 | Sakurai . |
| 4,152,012 | 5/1979 | Reidelbach et al. ................. 280/784 |
| 4,369,981 | 1/1983 | Chiba et al. . |
| 4,401,341 | 8/1983 | Hirabayashi et al. . |
| 4,416,461 | 11/1983 | Hayashi et al. ................. 280/784 X |
| 4,557,519 | 12/1985 | Matsuura ........................ 296/188 X |
| 4,684,151 | 8/1987 | Drewek .......................... 296/189 X |
| 4,708,391 | 11/1987 | Nakano ................................ 296/204 |
| 4,950,031 | 8/1990 | Mizunaga et al. . |

FOREIGN PATENT DOCUMENTS

| | | |
|---|---|---|
| 2509351 | 9/1975 | Fed. Rep. of Germany . |
| 1130427 | 8/1955 | France . |
| 59-11971 | 1/1984 | Japan . |
| 15272 | 1/1985 | Japan .............................. 296/195 |
| 45484 | 3/1985 | Japan .............................. 296/188 |
| 61-287822 | 12/1986 | Japan . |
| 62-26171 | 2/1987 | Japan . |
| 62-35643 | 9/1987 | Japan . |
| 63-89829 | 6/1988 | Japan . |
| 2160834 | 1/1986 | United Kingdom . |

Primary Examiner—Margaret A. Focarino
Assistant Examiner—Gary C. Hoge
Attorney, Agent, or Firm—Wenderoth, Lind & Ponack

[57] ABSTRACT

An automobile rear body structure includes a pair of rear side frames extending in directions longitudinally of a vehicle body, a cross member extending transversely between the paired rear side frames and having opposite ends rigidly secured to the rear side frames in a rear wheel zone, a rear floor panel rigidly secured at opposite side edges thereof to the rear side frames, and a fuel tank securely mounted on a lower surface of the rear floor panel. A rear portion of each rear side frame extending rearwardly from a joint between such rear side frame and the cross member has increased rigidity compared with a front portion thereof extending frontwardly from the joint.

26 Claims, 4 Drawing Sheets

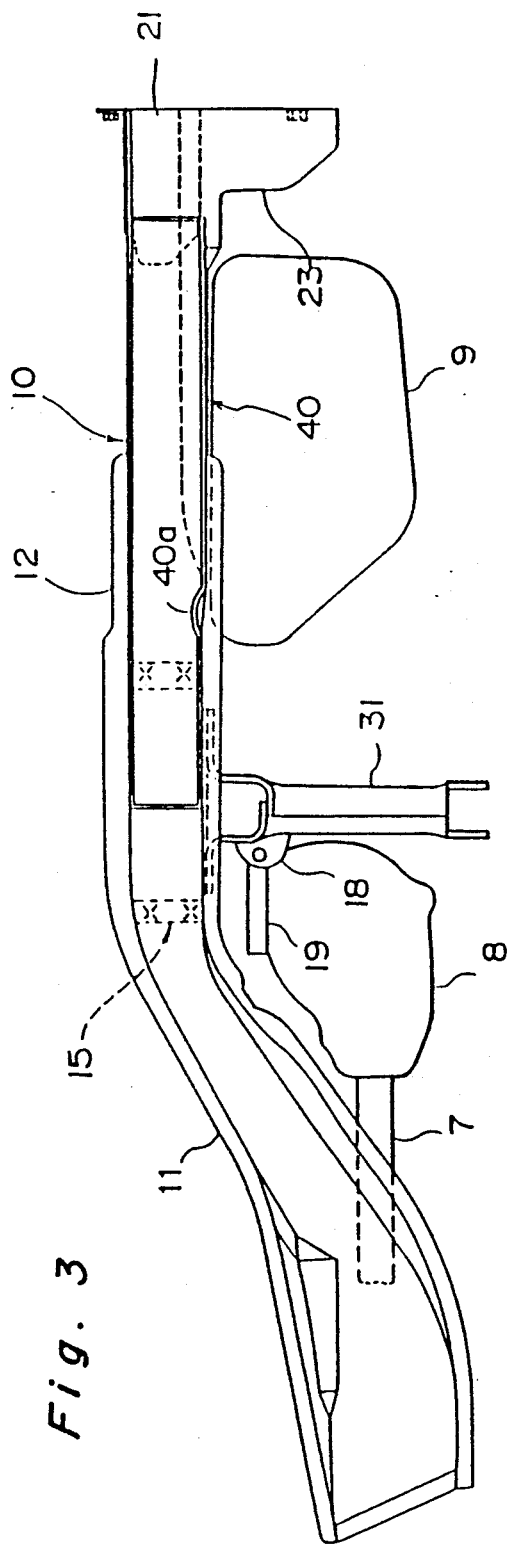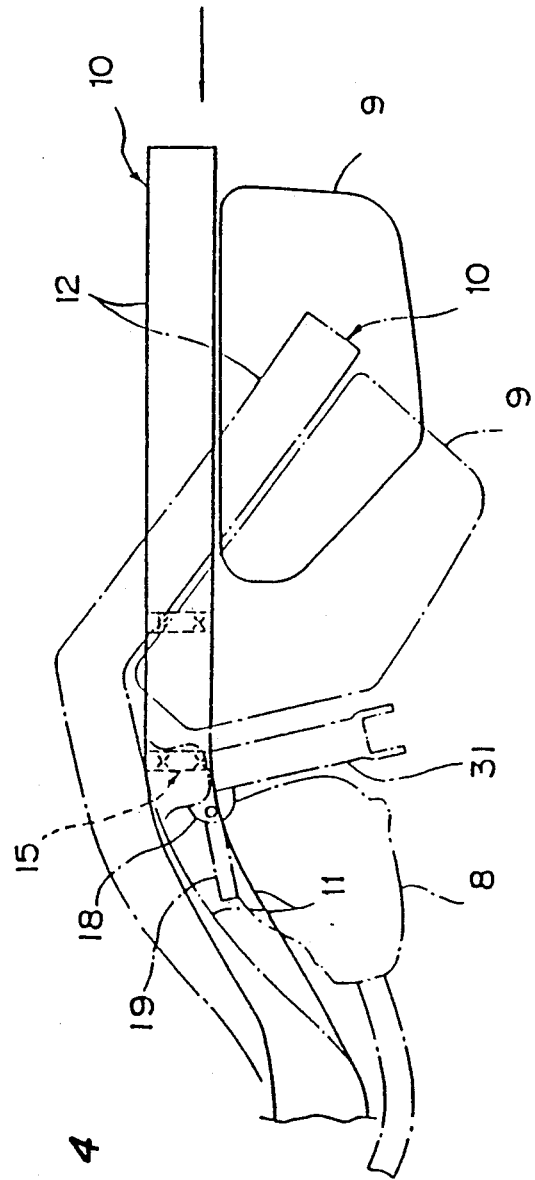
Fig. 3
Fig. 4

AUTOMOBILE REAR BODY STRUCTURE

BACKGROUND OF THE INVENTION

1. Field of the Invention

The present invention generally relates to an automobile body structure, and more particularly, to an automobile rear body structure.

2. Description of the Prior Art

Conventionally, an automobile rear body structure is generally comprised of a pair of spaced rear side frames each extending in a direction longitudinally of a vehicle body and a cross member extending transversely between the rear side frames and having opposite ends welded or otherwise secured to the rear side frames at the location of a rear wheel housing. To this cross member are generally secured suspension support members for carrying respective rear suspension systems, a differential unit support member for carrying a differential unit, and the like.

Accordingly, joints between the rear side frames and the cross member are required to be rigidified and strengthened. Japanese Utility Model Publication (examined) No. 62-35643 discloses one example of the structure of the joints.

A rear bumper is rigidly secured to the rear ends of the rear side frames. In the event of a rear-end collision, an impact load imposed upon the rear bumper is transmitted to the rear side frames and the impact energy is effectively absorbed by compressive buckling of the bumper and bending deformation of the rear side frames, thereby minimizing damage to a passenger compartment.

Since the joints between the rear side frames and the cross member have substantial rigidity and strength, the rear side frames are likely to be bent at locations behind the respective joints.

In general, a rear floor panel constituting a rear floor of the vehicle body is also secured to the rear side frames and a fuel tank is disposed on a lower surface of the rear floor panel behind the cross member.

Accordingly, if the rear side frames are bent or deformed at the locations behind the joints thereof with the cross member in the event of a rear-end collision, it is very likely that the fuel tank would be damaged. Such an arrangement, therefore, includes room for improvement of safety.

SUMMARY OF THE INVENTION

Accordingly, the present invention has been developed to substantially eliminate the above-described disadvantage inherent in the prior art automobile rear body structure, and an object of the present invention is to provide an improved automobile rear body structure which is capable of protecting a fuel tank in the event of a rear-end collision, thereby enhancing safety.

In accomplishing this and other objects, an automobile rear body structure according to the present invention comprises a pair of rear side frames, each extending in a direction longitudinally of a vehicle body, a cross member extending transversely between the paired rear side frames and having opposite ends rigidly secured to the rear side frames in a rear wheel zone, a rear floor panel rigidly secured at opposite side edges thereof to the rear side frames, and a fuel tank securely mounted on a lower surface of the rear floor panel. Furthermore, a rear portion of each rear side frame extending rearwardly from a joint between the rear side frame and the cross member has increased rigidity compared with other portions thereof.

In the structure according to the present invention, since the rear portion of each rear side frame has increased rigidity, this portion is unlikely to be bent or deformed even in the event of a rear-end collision. In addition, the aforementioned joint also has increased rigidity and strength since the respective rear side frame is rigidly secured to the cross member at this joint. Accordingly, in the event of a rear-end collision, the rear side frame is likely to be bent at the location immediately behind the joint where the strength of the rear side frame greatly changes.

This arrangement prevents the rear side frame from being bent or deformed at a portion thereof extending rearwardly from the joint, thereby effectively protecting a fuel tank disposed between the two rear side frames.

BRIEF DESCRIPTION OF THE DRAWINGS

This and other objects and features of the present invention will become more apparent from the following description of a preferred embodiment thereof with reference to the accompanying drawings, throughout which like parts are designated by like reference numerals, and wherein:

FIG. 3 is a side elevational view of the rear body structure of FIG. 1;

FIG. 4 is a schematic side elevational view of the rear body structure of FIG. 1 in the event of a rear-end collision;

FIG. 6 is a sectional view taken along line VI—VI in FIG. 1; and

DETAILED DESCRIPTION OF THE PREFERRED EMBODIMENTS

Figure 1:
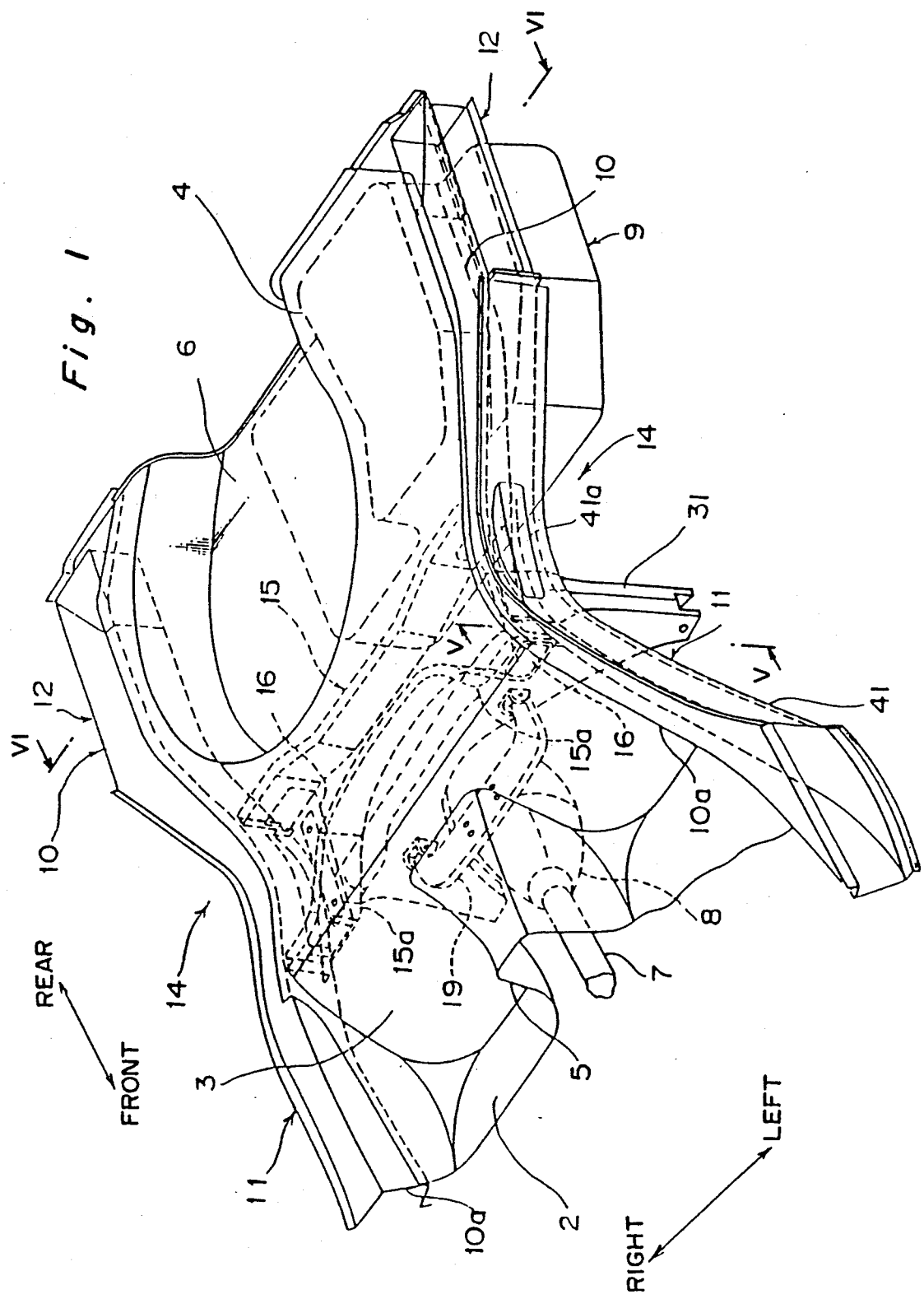
FIG. 1 is a perspective view of an automobile rear body structure according to the present invention.
Figure 2:
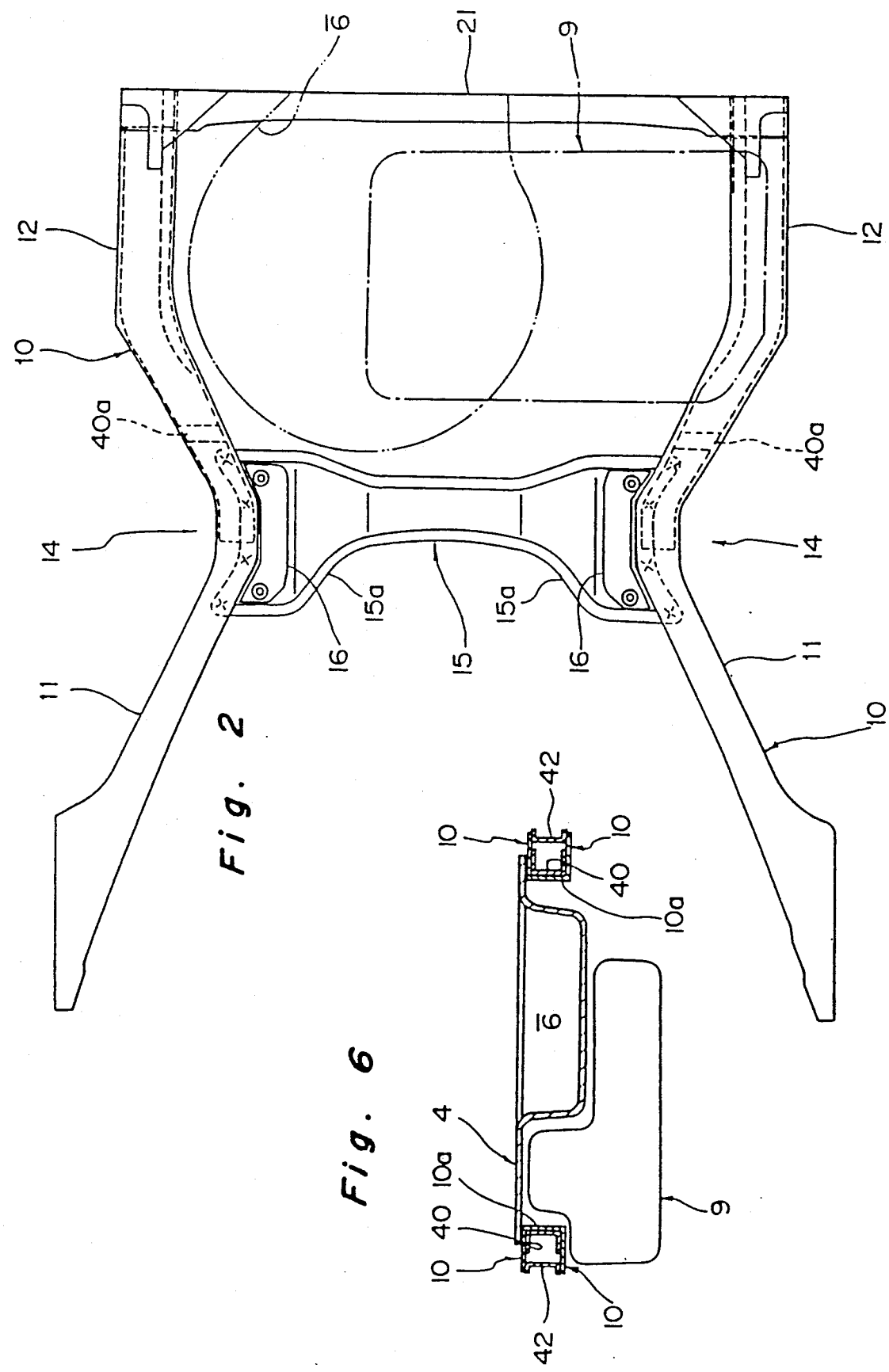
FIG. 2 is a top plan view of a rear body frame structure in the structure of FIG. 1.

Referring now to the drawings, there is shown in FIG. 1 an automobile rear body structure according to the present invention.

The rear body structure is comprised of a passenger compartment floor panel 2 for forming a floor of a passenger compartment, a kick-up panel 3 extending diagonally upwardly and rearwardly from the passenger compartment floor panel 2, and a rear floor panel 4 for forming a floor of a baggage compartment. These panels 2-4 are generally formed as a unitary structure and opposite side edges thereof are rigidly secured to a pair of rear side frames 10, each extending in a direction longitudinally of a vehicle body.

The passenger compartment floor panel 2 has a longitudinally extending tunnel 5 through which a drive shaft 7 extends. The rear floor panel 4 has a substantially circular recess 6 for accommodating a spare tire (not shown). A fuel tank 9 having an upwardly protruding portion so formed as to correspond to the configuration of the rear floor panel 4 is securely mounted on the lower surface of the rear floor panel 4.

The rear side frames 10 are connected at their rear ends to a transversely extending rear cross member 21 and are curved inwardly in a rear wheel zone defined in front of the fuel tank 9. These inwardly curved portions 14 are rigidly secured to opposite ends of a transversely extending medial cross member 15.

The medial cross member 15 has a substantially U-shaped cross section which is preferably orientated with its open end upward as shown in FIG. 1. The opposite ends of the medial cross member 15, to which the rear side frames 10 are secured, are widened to strengthen and rigidify the joints between the cross member 15 and the rear side frames 10. On these widened portions 15a are mounted nut plates 16 for mounting a rear suspension cross member 31, which extends below and along the first medial cross member 15 and carries rear wheel suspension systems.

Figure 5:
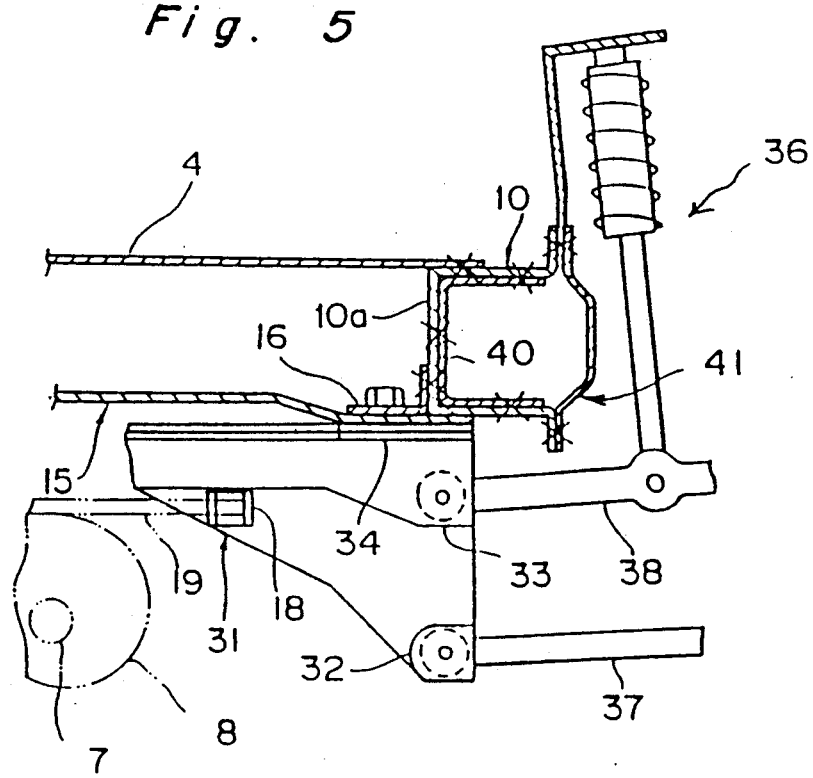
FIG. 5 is a sectional view taken along line V—V in FIG. 1.
Figure 7:
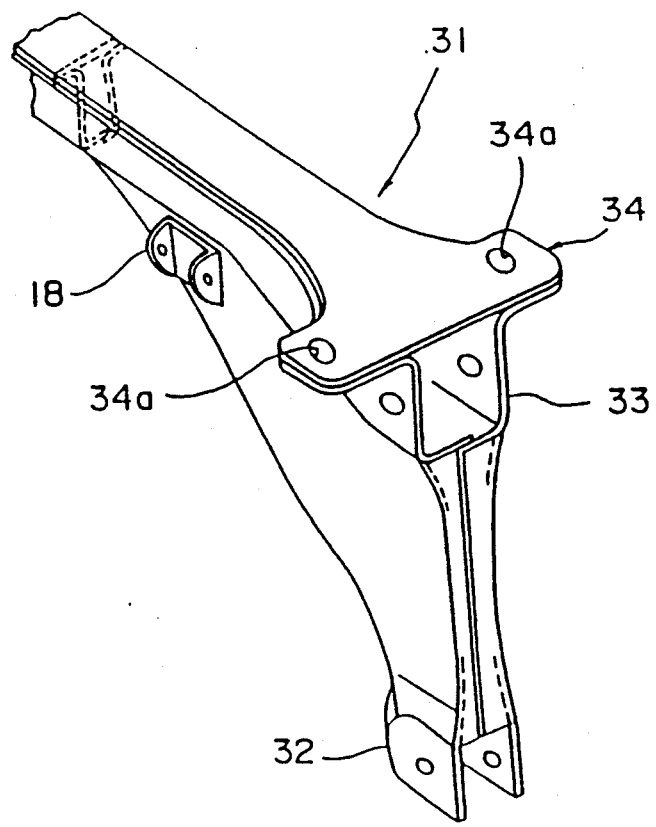
FIG. 7 is a fragmentary perspective view of a suspension cross member provided in the rear body structure of FIG. 1.

As shown in FIGS. 5 and 7, opposite ends of the rear suspension cross member 31 further extend downwardly. Each of such downwardly extending portions comprises a lower arm support portion 32 and an upper arm support portion 33 for supporting a lower arm 37 and an upper arm 38 of a rear wheel suspension system 36, respectively. Frontwardly and rearwardly extending flanges 34 having respective through-openings 34a are formed above each upper arm support portion 33. The rear suspension cross member 31 is securely mounted on the widened portions 15a of the medial cross member 15 via the nut plates 16 by means of bolts extending through the through-openings 34a of the flanges 34.

The widened portions 15a of the medial cross member 15 greatly enhance the bearing rigidity of the rear wheel suspension systems 36.

An upper portion of a differential unit 8 is securely mounted on a substantially U-shaped mounting member 19, which extends transversely and has rearwardly extending opposite ends carried by two brackets 18 rigidly secured to the front surface of the rear suspension cross member 31.

As shown in FIG. 3, each of the rear side frames 10 comprises a kick-up portion 11 rising diagonally toward the rear so as to correspond to the configuration of the floor panel, and a straight portion 12 extending substantially straight from the kick-up portion 11 toward the rear. A rear bumper (not shown) is securely mounted on the rear ends of the paired rear side frames 10 via a bumper bracket 23. The horizontal centerline of the bumper bracket 23 is preferably shifted below the horizontal neutral axes of the straight portions 12.

Each of the rear side frames 10 is reinforced by a reinforcing member 40 secured thereto. More specifically, each rear side frame 10 comprises an inner plate 10a having a substantially U-shaped cross section, which is preferably orientated with its open end outwardly as shown in FIG. 1. A medial closure plate 41 as illustrated in FIG. 5 and a rear closure plate 42 as illustrated in FIG. 6, both of which are steel plates formed by pressing, are secured to open ends of the inwardly curved portion 14 and the straight portion 12, respectively, to form a closed section. The reinforcing member 40 also has a U-shaped cross section and is secured inside the rear side frame inner plate 10a with its open end being directed outwardly as shown in FIG. 5.

Although not shown, the kick-up portion 11 of the rear side frame 10 is also reinforced by another reinforcing member separate from the reinforcing member 40. The closure plate 41 is preferably provided at its innermost portion with a protruding portion 41a protruding outwardly therefrom for the reinforcement of the inwardly curved portion 14, thereby preventing the inwardly curved portion 14 from being bent or deformed in the event of a rear-end collision.

The reinforcing member 40 extends from the rear end of the rear side frame 10 to the joint with the medial cross member 15 and the front end thereof is rigidly secured to the rear portion of such joint. As shown in FIG. 3, the reinforcing member 40 is preferably provided with a protrusion or indentation 40a to form a weakened area at a location immediately behind the joint between the reinforcing member 40 and the medial cross member 15. Since the protrusion 40a causes the reinforcing member 40 to be discontinuous in strength or rigidity, the reinforcing member 40 is susceptible to bending at the location where the protrusion 40a is formed, in the event of a rear-end collision.

Even if an automotive vehicle having the above-described rear body structure is subjected to a rear-end collision and an impact load is imposed upon the straight portion 12 of the rear side frame 10 via the rear bumper (not shown), the portion of the rear side frame 10 between the rear end thereof and the joint with the medial cross member 15, which is reinforced by the reinforcing member 40, is resistant to being bent or deformed.

On the other hand, the joint where the rear side frame 10 is rigidly secured to the transversely extending medial cross member 15 naturally is highly enhanced in strength and rigidity. Accordingly, the strength of the rear side frame 10 changes most greatly at a location immediately behind the joint, thus causing the rear side frame 10 to be easily bent at this location in the event of a rear-end collision.

In other words, the portion of the rear side frame 10 extending rearwardly from the joint is resistant to being bent even in the event of a rear-end collision, and therefore, the fuel tank 9 disposed between the two reinforced rear side frames 10 can be effectively protected.

Instead of the provision of the reinforcing member 40, the portion of the rear side frame 10 extending rearwardly from the joint may have an increased stiffness, for example, by making this portion thicker.

It is noted that the position of the bending point at which the rear side frame 10 is subject to bending can be shifted by changing the width of the widened portion 15a of the medial cross member 15.

The protrusion or indentation 40a of the reinforcing member 40 also causes the rear side frame 10 to be easily bent at a location immediately behind the joint with the medial cross member 15.

Furthermore, when an impact load is imposed upon the straight portion 12 of the rear side frame 10, the rear side frame 10 is crushed frontwardly so that the joint between the rear side frame 10 and the medial cross member 15 will be raised upwardly and the rear end of the straight portion 12 will be depressed, as shown by single-dotted chain lines in FIG. 4, under conditions at which the front end of the kick-up portion 11 is kept substantially unmoved. The reason for this is that the straight portion 12 is upwardly shifted from the fixed front end of the kick-up portion 11 and the portion of the rear side frame 10 immediately behind the joint acts as a bending point. In this event, since the differential unit 8 along with the rear suspension cross member 31, the bracket 18 and the transversely extending mounting member 19 is moved frontwardly upwardly, no collision takes place between the differential unit 8 and the fuel tank 9. Furthermore, the fact that the rear end of the rear side frame 10 is depressed prevents the fuel tank 9 from being damaged by the automotive vehicle which has caused the rear-end collision.

In addition, since the horizontal centerline of the bumper bracket 23 is vertically shifted below the horizontal neutral axis of the straight portion 12, an impact load generated by the rear-end collision produces a moment which so acts as to depress the rear end of the rear side frame 10, thereby ensuring the aforementioned manner of deformation.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An automobile rear body structure comprising:
a pair of rear side frames extending in directions to be longitudinal of a vehicle body;
a cross member extending transversely between said pair of rear side frames and having opposite ends connected rigidly thereto at joints in respective rear wheel zones thereof, each said rear side frame including a rear portion extending rearwardly from the respective said joint with said cross member; a rear suspension cross member extending below and along and being secured to a lower surface of said cross member; and
each said rear side frame including means for, in the event of a rear-end collision with said structure, causing said rear side frame to bend at a location immediately rearwardly of the respective said joint, such that each said rear portion bends as a unit and such that a fuel tank to be positioned between said rear portions is protected from damage.

2. A structure as claimed in claim 1, wherein said means comprises an indentation formed in said rear side frame at said location.

3. A structure as claimed in claim 1, wherein said means comprises means for increasing the rigidity of said rear portion.

4. A structure as claimed in claim 3, wherein said rear portion has increased thickness.

5. A structure as claimed in claim 3, wherein said increasing means comprises a reinforcing member rigidly secured to and reinforcing said rear portion.

6. A structure as claimed in claim 5, wherein each of said rear side frames comprises an inner plate of substantially U-shaped cross section having an outwardly directed open end and at least one closure plate secured to said open end of said inner plate so that a closed section is defined therein, and wherein said reinforcing member comprises a member of substantially U-shaped cross section having an outwardly directed open end and rigidly secured inside said inner plate.

7. A structure as claimed in claim 1, wherein opposite ends of said rear suspension cross member extend downardly for carrying rear wheel suspension systems.

8. A structure as claimed in claim 1, wherein said rear portions are rectilinear.

9. A structure as claimed in claim 8, further comprising a bumper bracket secured to rear ends of said rectilinear rear portions.

10. A structure as claimed in claim 9, wherein a horizontal centerline of said bumper bracket is vertically below horizontal center axes of said rectilinear rear portions.

11. A structure as claimed in claim 1, wherein said opposite ends of the first said cross member are widened to thereby strengthen said joints.

12. An automobile rear body structure comprising:
a pair of rear side frames extending in directions to be longitudinal of a vehicle body;
a cross member extending transversely between said pair of rear side frames and having opposite ends connected rigidly thereto at joints in respective rear wheel zones thereof, each said rear side frame including a rear portion extending rearwardly from the respective said joint with said cross member; and
each said rear side frame including means for, in the event of a rear-end collision with said structure, causing said rear side frame to bend at a location immediately rearwardly of the respective said joint, such that each said rear portion bends as a unit and such that a fuel tank to be positioned between said rear portions is protected from damage;
wherein said means comprises means for increasing the rigidity of said rear portion;
wherein each of said rear side frames comprises an inner plate of substantially U-shaped cross section having an outwardly directed open end and at least one closure plate secured to said open end of said inner plate so that a closed section is defined therein, and wherein said reinforcing member comprises a member of substantially U-shaped cross section having an outwardly directed open end and rigidly secured inside said inner plate; and
wherein each of said rear side frames includes an inwardly curved portion in said rear wheel zone thereof, and said closure plate has protruding outwardly therefrom a protruding portion for reinforcement of said inwardly curved portion.

13. An automobile rear body structure comprising:
a pair of rear side frames extending in directions to be longitudinal of a vehicle body;
a cross member extending transversely between said pair of rear side frames and having opposite ends connected rigidly thereto at joints in respective rear wheel zones thereof, each said rear side frame including a rear portion extending rearwardly from the respective said joint with said cross member;
a fuel tank supported between said rear portions of said rear side frames;
a rear suspension cross member extending below and along and being secured to a lower surface of said cross member; and
each said rear side frame including means for, in the event of a rear-end collision with said structure, causing said rear side frame to bend at a location immediately rearwardly of the respective said joint, such that each said rear portion bends as a unit and such that a fuel tank to be positioned between said rear portions is protected from damage.

14. A structure as claimed in claim 13, further comprising a rear floor panel rigidly secured at opposite sides thereof to said rear side frames.

15. A structure as claimed in claim 14, wherein said fuel tank is mounted to a lower surface of said rear floor panel.

16. A structure as claimed in claim 13, wherein said means comprises an indentation formed in said rear side frame at said location.

17. A structure as claimed in claim 13, wherein said means comprises means for increasing the rigidity of said rear portion.

18. A structure as claimed in claim 17, wherein said rear portion has increased thickness.

19. A structure as claimed in claim 17, wherein said increasing means comprises a reinforcing member rigidly secured to and reinforcing said rear portion.

20. A structure as claimed in claim 19, wherein each of said rear side frames comprises an inner plate of substantially U-shaped cross section having an outwardly directed open end and at least one closure plate secured to said open end of said inner plate so that a closed section is defined therein, and wherein said reinforcing member comprises a member of substantially U-shaped cross section having an outwardly directed open end and rigidly secured inside said inner plate.

21. A structure as claimed in claim 13, wherein opposite ends of said rear suspension cross member extend downwardly for carrying rear wheel suspension systems.

22. A structure as claimed in claim 13, wherein said rear portions are rectilinear.

23. A structure as claimed in claim 22, further comprising a bumper bracket secured to rear ends of said rectilinear rear portions.

24. A structure as claimed in claim 23, wherein a horizontal centerline of said bumper bracket is vertically below horizontal center axes of said rectilinear rear portions.

25. A structure as claimed in claim 13, wherein said opposite ends of the first said cross member are widened to thereby strengthen said joints.

26. An automobile rear body structure comprising:

a pair of rear side frames extending in directions to be longitudinal of a vehicle body;

a cross member extending transversely between said pair of rear side frames and having opposite ends connected rigidly thereto at joints in respective rear wheel zones thereof, each said rear side frame including a rear portion extending rearwardly from the respective said joint with said cross member;

a fuel tank supported between said rear portions of said rear side frames; and each said rear side frame including means for, in the event of a rear-end collision with said structure, causing said rear side frame to bend at a location immediately rearwardly of the respective said joint, such that each said rear portion bends as a unit and such that said fuel tank positioned between said rear portions is protected from damage;

wherein said means comprises means for increasing the rigidity of said rear portion;

wherein said increasing means comprises a reinforcing member rigidly secured to and reinforcing said rear portion;

wherein each of said rear side frames comprises an inner plate of substantially U-shaped cross section having an outwardly directed open end and at least one closure plate secured to said open end of said inner plate so that a closed section is defined therein, and wherein said reinforcing member comprises a member of substantially U-shaped cross section having an outwardly directed open end and rigidly secured inside said inner plate; and wherein each of said rear side frames includes an inwardly curved portion in said rear wheel zone thereof, and said closure plate has protruding outwardly therefrom a protruding portion for reinforcement of said inwardly curved portion.

* * * * *

UNITED STATES PATENT AND TRADEMARK OFFICE
CERTIFICATE OF CORRECTION

PATENT NO. : 5,110,177

DATED : May 5, 1992

INVENTOR(S) : Akio SHIBATA

It is certified that error appears in the above-identified patent and that said Letters Patent is hereby corrected as shown below:

On the cover page, line 2, change "Akio" to --Shibata--;
line 5, item # [75], change "Shibata Akio" to --Akio Shibata--.

Signed and Sealed this

Seventh Day of September, 1993

Attest:

BRUCE LEHMAN

*Attesting Officer*        *Commissioner of Patents and Trademarks*